Nov. 15, 1960  R. P. BRADY  2,960,216
INSULATED RECEPTACLE
Filed Aug. 12, 1958
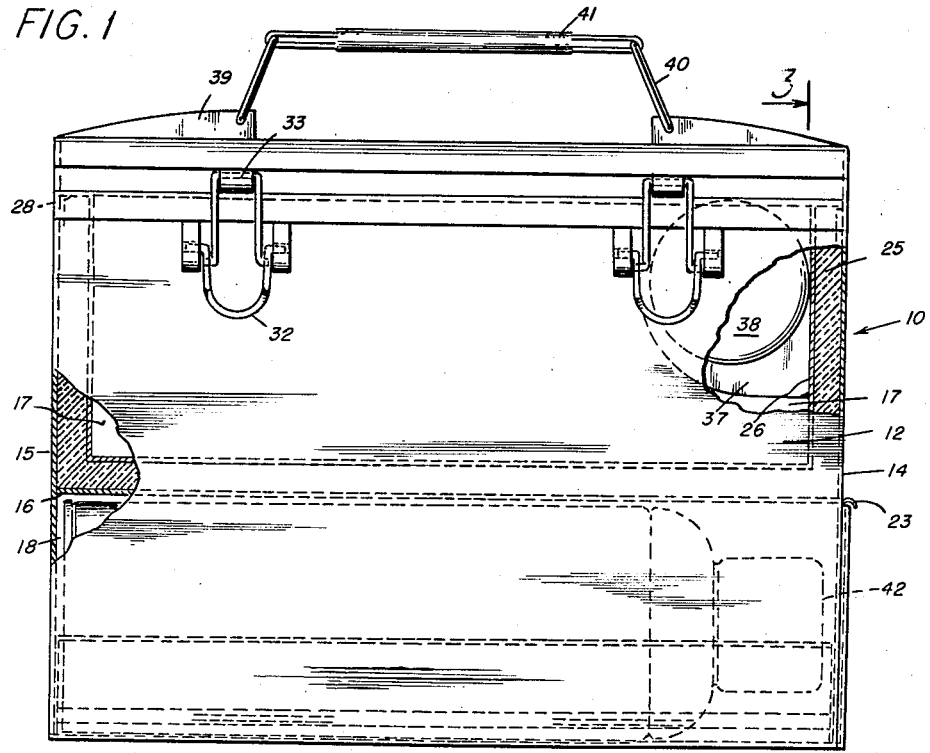
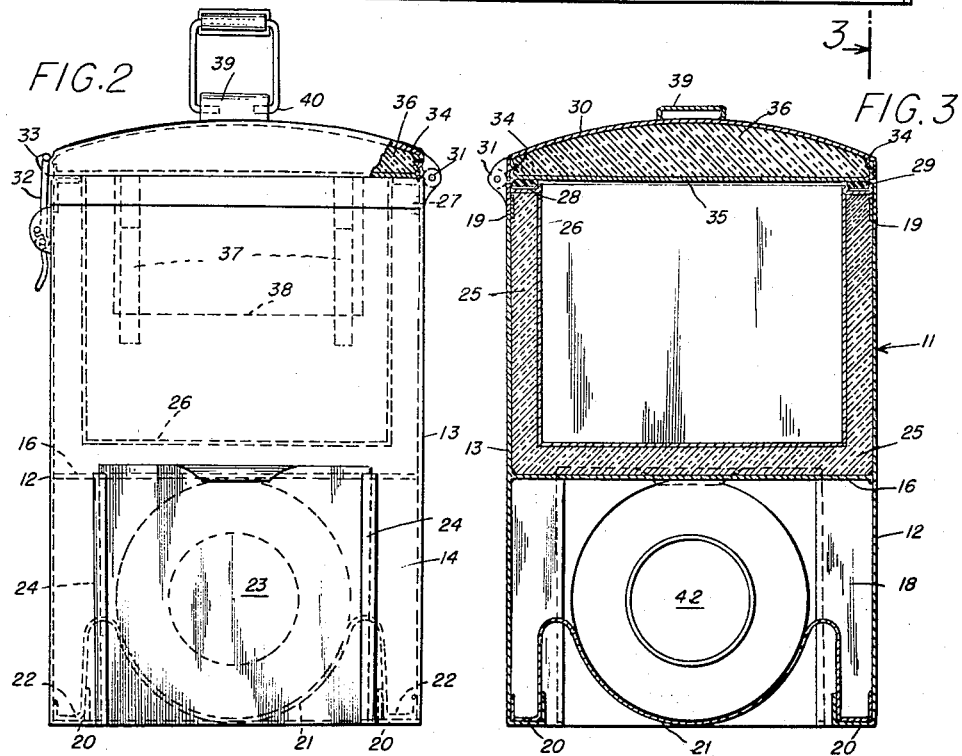

United States Patent Office 2,960,216
Patented Nov. 15, 1960

2,960,216

INSULATED RECEPTACLE

Raymond P. Brady, 12 Ashley Ave., Brielle, N.J.

Filed Aug. 12, 1958, Ser. No. 754,644

3 Claims. (Cl. 206—4)

This invention relates to insulated portable containers. More particularly it relates to insulated food receptacles such as lunch boxes, to which use, however, it is not restricted.

A preferred type of equipment for picnics or other take-along meals is one which provides for liquid refreshment as well as appropriate storage for solid foods. Many individual lunch boxes come equipped with a thermos bottle, and such boxes are usually designed to carry the bottle either in upright position or otherwise within a single unit. Of these, most of the lunch boxes available to the public are constructed to clip a thermos bottle within the confines of a hinged, hollow cover.

Such boxes, however, while appearing to be adequate when new for the intended functions, are found in practice to be deficient in construction. This is due to the fact that the boxes tend to upset when opened with a filled thermos bottle over-weighing the receptacle, causing the contents to spill out.

Another failure of available food carriers, especially when subjected to outdoor use, is the thin sheet material of which they are constructed, affording no protection whatever against extreme hot or cold temperatures to food stored therein. Such deficiency results in rapid spoilage of delicate foods in hot weather and freezing of foods in winter.

It is an object of the present invention to overcome the above stated deficiencies by providing a portable food carrier which is stable under all normal operational conditions and is equipped to protect solid foods from spoiling due to excessive or insufficient heat. A further object is to produce an improved lunch box by a more efficient method and thus avail the public of resulting economies.

I have now invented a new portable food receptacle which is adapted to enclose a filled insulated bottle without danger of upsetting, contains a thoroughly insulated compartment utilizing modern insulating materials, and completely separates the insulated from the non-insulated portions of the receptacle.

The container forming the invention is of rigid H-shaped cross-sectional structure, half of which will house a fully insulated compartment, with provision for a coolant when desired, while the other half provides means for carrying a thermos bottle at a low center of gravity. When filled, the low-slung weighted bottle provides an additional steadiness to the container when it is placed on a supporting surface.

Further features and advantages of the invention will be apparent in the following detail description and the accompanying drawings which illustrate preferred embodiments of the invention, wherein:

Fig. 1 is a front elevation of the rigid container, partly in section to show the inner construction and separation of the insulated from the uninsulated compartment, other features being shown in dotted line;

Fig. 2 is an elevation of one side of the container illustrated in Fig. 1, showing the outer construction of the thermos compartment with a sectional view of the insulated cover portion; and Fig. 3 is a sectional elevation showing the collapsible handle and details of the basic H-shaped rigid frame structure taken along line 3—3 of Fig. 1.

Referring now to the drawings, the portable receptacle or lunch box 10 is built upon a sturdy frame 11 of H-shaped cross-sectional configuration. The frame may preferably be moulded from a suitable high impact plastic, stamped from sheet material or otherwise constructed to embody the inventive concept.

The basic frame consists of a front portion 12, a rear portion 13 and two side portions 14, 15. The integrally molded cross bar 16 separates the receptacle into an upper and lower compartment 17, 18.

The upper edge of the frame is recessed as at 19 and the lower portions of the front and rear of the frame terminate in right angled supporting flanges 20, 20 for purposes hereinafter set forth.

It will be noted that frame 11 is molded with an open top and bottom. The lower compartment 18 is enclosed at the bottom by a one-piece resilient bottle holder 21 terminating in complementary flanged sides 22, 22 which are constructed to snap fit into flanges 20, 20. Access to the lower compartment 18 is had by means of a door 23 sliding between two grooved plastic guides 24, 24. The guides may be closed at the bottom to prevent gravitational separation of the door through the guides; or a hook (not shown) may be placed on the lower inside of the door for the same purpose.

An inner lining 26 for the upper compartment 17 is provided with an H-shaped upper rim 27, the lower portion of which is adapted to be pressed or snapped over the recessed portion 19 for a flush fitting with the exterior of the receptacle. Ample thermal protection for either cold or hot foods such as sandwiches, fruits, pastry, meats; hot meals such as soups, stews, etc., is provided by the compartment 17. This portion of the container is thoroughly insulated and is so constructed that fibre glass or sheets of styrofoam 25 may be inserted to line the bottom, sides and ends of the upper compartment.

The flanged H-shaped rim 27 extends upwardly forming a peripheral groove 28 into which a stamped out rubber gasket 29 may be seated for insulatedly sealing engagement of the cover against compartment 17.

A two piece insulated cover has an outer section 30 pivotally connected to the rear of the container 13 as by hinge 31. The cover may be secured to the front 14 of the lunch box by one or more off-center locks 32 fastening over hooks 33 molded or otherwise affixed to the cover. Beads 34, 34 are provided in the inner surface of the outer section over which a bottom plate 35 may be snapped fit to retain insulation 36 within the hollow cover.

Clamps 37 may be placed in the upper compartment to conveniently support a can of coolant 38 for hot weather use. The clamps illustrated in the drawing are suitable to support a coolant can of approximately 1¾ inch diameter.

The molded streamlined cover rim 30 may be raised as at 39 to provide sockets in which arms 40 of collapsible handle 41 are seated.

In operation, the half insulated, thermal variance of the container works to the advantage of storing hot or cold foods and drink in all kinds of weather and in either extreme of temperature. In addition, the novel construction for storing a thermos bottle 42 not only provides a well balanced, rigid container which can be opened at will without danger of upsetting and spilling contents therein, but one that can also be economically produced and assembled. The bottle container 21 can of course be moulded as an integral part of frame 11 if desired.

The forms of the invention here described and illustrated are presented merely as examples of how the invention may be embodied and applied. Other forms, embodiments and applications of the invention, coming within the proper scope of the appended claims, will, of course, suggest themselves to those skilled in the art.

I claim:

1. A container comprising an H-shaped frame having a front wall, a rear wall, two side walls and a partition wall uniting said front, rear and side walls to form an upper and lower compartment, an arcuately shaped bottle retainer, said retainer connected to said front, side and rear walls to form a bottom wall for said container and enclose said lower compartment, an aperture disposed in one of said side walls proximate the bottom thereof affording access to said retainer, a closure for said aperture to secure a thermos-type bottle within said retainer and a cover for said container to enclose the upper compartment thereof.

2. A container according to claim 1 having thermal variant upper and lower compartments, said upper compartment provided with insulating material adapted to be disposed about the periphery thereof, a first inner lining, resilient means for securing said lining in spaced relation to said front, side, rear and partition walls to retain said material therebetween, said cover provided with a second inner lining, resilient means for securing said second lining in spaced relation to said cover to retain such material therebetween and insulate said upper compartment.

3. A container according to claim 1 having grooves disposed on both outer sides of said aperture, said grooves guiding said closure for vertical sliding therein.

References Cited in the file of this patent

UNITED STATES PATENTS

| | | |
|---|---|---|
| 652,403 | Schafer | June 26, 1900 |
| 2,321,703 | Rivard | June 15, 1943 |
| 2,552,641 | Morrison | May 15, 1951 |
| 2,763,366 | Smith et al. | Sept. 18, 1956 |